Aug. 19, 1969  B. STOEFFLER  3,462,162
UNIVERSAL CHUCK

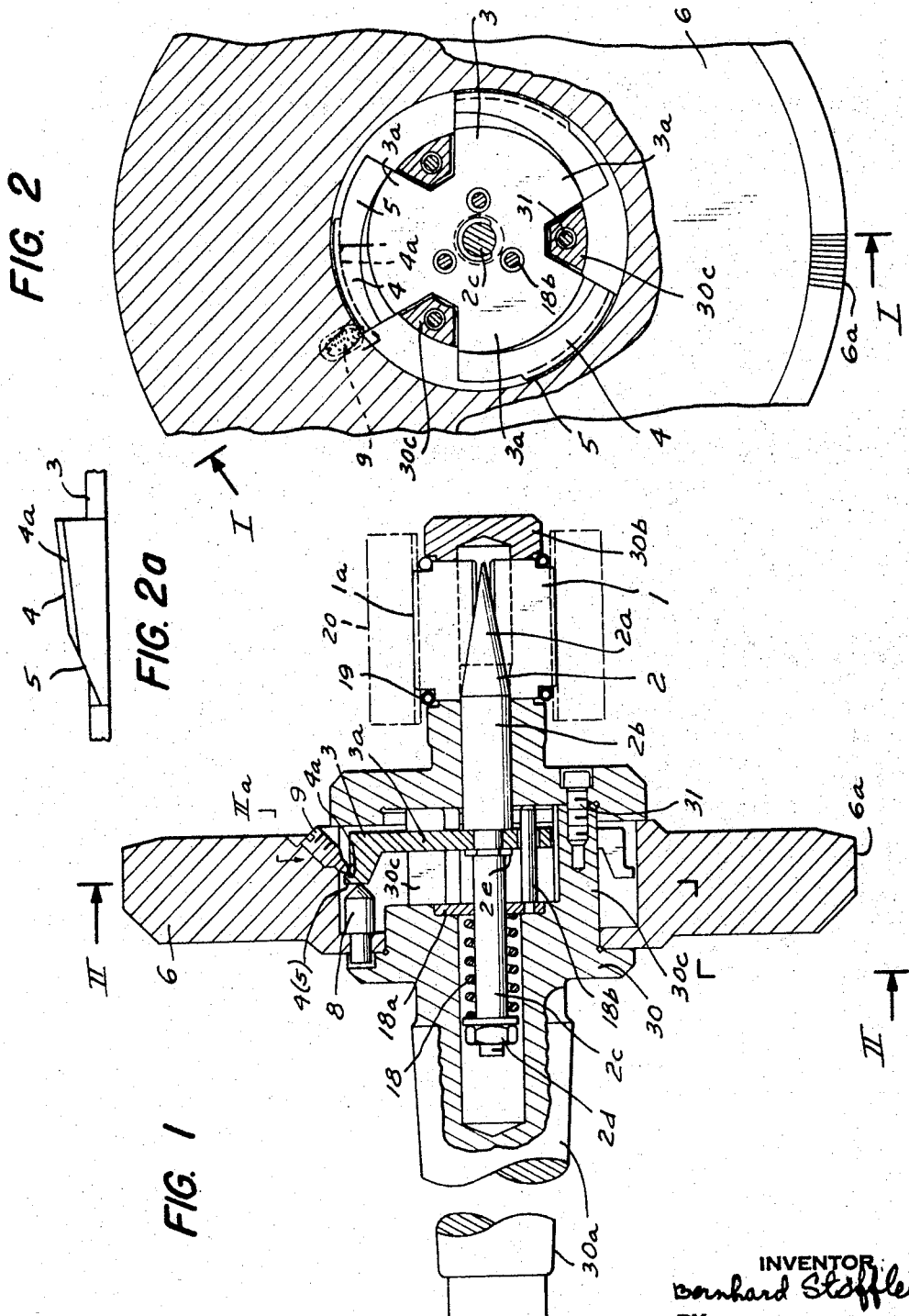

Filed Nov. 3, 1967  2 Sheets-Sheet 2

INVENTOR:
Bernhard Stoeffler
BY
Michael S. Striker
ATTORNEY

United States Patent Office 3,462,162
Patented Aug. 19, 1969

3,462,162
UNIVERSAL CHUCK
Bernhard Stoeffler, Gartringen, Kreis Boblingen, Germany, assignor to Vulkan-Werk Wilhelm Diebold, Stuttgart-Feuerbach, Germany
Filed Nov. 3, 1967, Ser. No. 680,564
Claims priority, application Germany, Nov. 10, 1966, V 32,317
Int. Cl. B23b 31/40, 5/22, 5/34
U.S. Cl. 279—2
16 Claims

ABSTRACT OF THE DISCLOSURE

A universal chuck has jaws which are moved outwardly by a cone-shaped end portion of a mandrel to which a cam plate is secured. When a hand wheel is manually turned, followers on the hand wheel act on cam portions of the cam plate to advance the mandrel against the action of a spring so that the jaws are operated.

BACKGROUND OF THE INVENTION

The present invention relates to universal chucks of the type in which several, usually three, jaws are moved in radial direction. The jaws may be moved inward or outward to a gripping position, and the present invention is particularly concerned with a universal chuck for moving internal chucks simultaneously outwardly to a gripping position engaging the surface of a central bore of a workpiece.

Universal chucks of this general type are well known and require a considerable time for moving the jaws from an inoperative position to the gripping position. This is mainly due to the fact that most known chucks are operated by means of a spanner or like tool which has to be manually turned several revolutions before the workpiece is gripped. The jaws have to move particularly long distanecs in outward direction if a workpiece having an inner thread is to be clamped; otherwise the thread requires first the threading of the workpiece onto corresponding outer threads on the jaws, whereupon the jaws are moved to the gripping and clamping position. It can be generally stated that the time required for moving the jaws to the gripping position, the time for moving the jaws farther for tightly gripping the workpiece, and the other involved time periods until the operation on the gripped workpiece can be started is between 10 and 20 seconds for manually actuated universal chucks, which is comparatively long and uneconomical, considering that a great number of workpieces are to be successively gripped and released by the universal chuck.

It is also known to operate universal chucks by a hydraulic or pneumatic motor, and chucks of this type perform the gripping operation at a high speed and in a short time. On the other hand, the attachment of the chuck to the hydraulic or pneumatic motor takes a comparatively long time, and the basic cost of such an apparatus is comparatively high so that no economical advantages are obtained as compared with the manually operated universal chucks. Another disadvantage of motor-operated chucks is that there is no "feel" of the gripping force so that the workpiece or parts of the chuck may be permanently deformed.

SUMMARY OF THE INVENTION

It is one object of the invention to overcome the disadvantages of known chucks for rapidly clamping workpieces, and provide a universal chuck which has a simple construction, is inexpensively manufactured, and rapidly clamps and grips a workpiece.

Another object of the invention is to provide a universal chuck which is manually operated by a hand wheel which is turned a comparatively small angle, and less than half a revolution.

Another object of the invention is to provide a manually operated universal chuck which has a great range of jaw movement so that workpieces of different size can be clamped by the chuck.

With these objects in view, the present invention relates to a universal chuck which comprises a plurality of jaws mounted on supporting means spaced about an axis and for movement in radial direction, actuating means movable along said axis and having wedge means for displacing the jaws simultaneously in radial direction, preferably outward, from an inoperative position to a gripping position, and operating means mounted on the supporting means for angular movement. Either the actuating means or the operating means has a plurality of circumferentially extending axially rising cam portions, and the respective other means has a plurality of follower means respectively engaging the cam portions. When the operating means, preferably a hand wheel, is turned, the actuating means are moved in axial direction, and the wedge means displace the jaws to the gripping position.

In the preferred embodiment of the invention, the operating means includes a hand wheel carrying the follower means in the form of pointed pins, and the actuating means include a mandrel having a cone-shaped end portion in sliding contact with inner portions of the jaws. The cam means include a cam plate having a central portion secured to the mandrel and a plurality of radial arms having circumferentially extending axially rising cam portions on the outer ends. The supporting means include guide means located between the arms of the cam plate for guiding the cam plate and mandrel in axial direction while blocking rotation of the same.

In accordance with the invention, each of the cam portions is simultaneously engaged by a follower pin, and in every angular position of the cam plate, all follower pins are in contact with points of the cam portions which have the same axial height so that in each angular position of the hand wheel, all three arms of the cam plate are displaced the same axial distance, together with the mandrel.

It is preferred to vary the gradients of the cam portions so that a first portion of the cam track of each cam portion has a higher gradient so that the jaws rapidly approach the workpiece surface. The second portion of the cam track of each cam portion has a smaller gradient so that the clamping jaw moves slowly outward while pressing against the workpiece and gripping the same. It is advantageous to provide such a gradient of the second cam track portion that the follower means are in contact with the second cam track portions in a self-locking engagement so that pressure on the jaws cannot turn back the hand wheel.

With a suitably selected gradient of the cam tracks, an angular displacement of the hand wheel between 60° and 120° is sufficient for moving the jaws in radial direction between 2 mm. and 5 mm. It is possible to clamp workpieces whose inner diameters vary between 20 mm. and 30 mm. with the same mandrel and exchangeable clamping jaws without requiring adapter sleeves. Exchangeable units including a holder for a set of jaws and springs, and a pin projecting into the bore of the workpiece and having radial slots for the jaws, can be easily attached to the devices when different workpieces are to be clamped.

It is advantageous to mount the jaws in such a manner that they can be retracted to a position in which their outer gripping faces are flush with the outer surface of the pin which is inserted into the bore of the workpiece. This facilitates the mounting of workpieces having an inner thread since it is not necessary to screw the workpiece onto jaws having threaded gripping faces. Only three seconds are required for placing the workpiece on the centering pin of the universal chuck, and for clamping the same.

Since, in the preferred embodiment of the invention, the arms of the cam plate are slightly resilient, the elastic deformation of the arms compensates for tolerances of the inner bores of the workpieces, and even if the hand wheel is operated with an excessive manual force, neither the workpiece nor parts of the chuck can be permanently deformed. Therefore, the operator need not cautiously "feel" whether he operates the chuck with the proper force without deforming the workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an axial sectional view taken on line I—I in FIG. 2;

FIG. 2 is a fragmentary side view, partially in section, taken on line II—II in FIG. 1;

FIG. 2a is a fragmentary developed view taken in the direction of the arrow IIa in FIG. 1 illustrating a cam portion;

DESCRIPTION OF THE PREFERRED EMBODIMENTS

Figure 4:
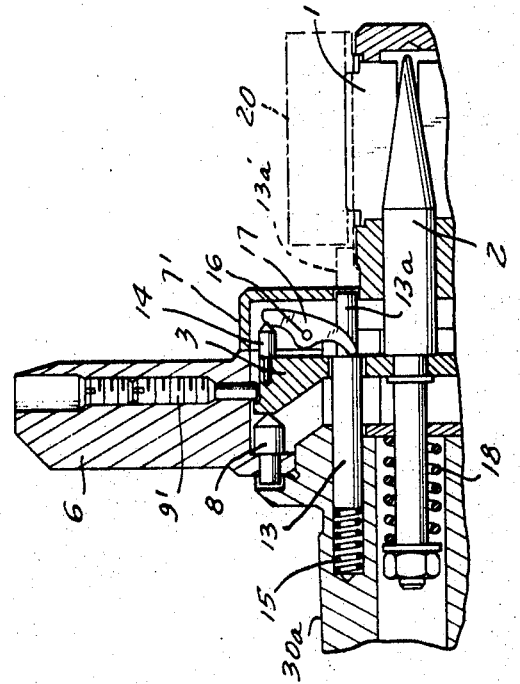
FIG. 4 is a fragmentary axial sectional view illustrating a third embodiment of the invention provided with a control stop.

Referring first to the embodiment illustrated in FIGS. 1, 2 and 2a, the universal chuck has supporting means 30 including an end portion 30a by which the chuck is secured to a machine tool, a pin portion 30b having radial slots in which jaws 1 are mounted for movement between a retracted inoperative position flush with the outer surface of pin portion 30b and an outer gripping position engaging the inner surface of a central bore in a workpiece 20. Portions 30a and 30b are secured to each other by screws 31 which are threaded into threaded bores in guide portions 30c of portion 30a which are angularly spaced from each other and have a somewhat trapezoidal cross section, as best seen in FIG. 2. A mandrel 2 is mounted in coaxial bores in supporting parts 30a and 30b for axial axial movement, and has a cone-shaped end portion 2a slidingly engaging corresponding inner wedge faces of jaws 1 whose ends are surrounded by circular coil springs 19 so that the jaws normally assume a retracted inoperative position, and are moved to an outer gripping position when mandrel 2 is advanced toward the right as viewed in FIG. 1.

Mandrel 2 has a cylindrical portion 2b of greater diameter and a cylindrical portion 2c of smaller diameter. A spring 18 is mounted on portion 2c surrounding the same, and abutting at one end a washer and nut 2d threadedly secured to the end of mandrel portion 2c. The other end of spring 18 abuts a disk 18a which has axially projecting pins 18b. A cam plate 3 has a central portion mounted on mandrel 2 abutting the shoulder of mandrel portion 2b and being held by a spring ring 2e. Three radial arms 3a project from the central portion of cam plate 3 and have at the ends thereof circumferentially extending axially rising cam portions 4 and 5 whose cam tracks have different gradients, the cam track of cam portion 5 being steeper than the cam track of cam portion 4, as best seen in FIG. 2a. The central portion of cam disk 3 has three bores through which the three pins 18b pass. The outlines of the arms 3a of cam plate 3 correspond to the cross section of guide portions 30c so that cam plate 3 can move in axial direction with mandrel 2, but is prevented from turning about the common axis of mandrel 2 and jaws 1. Since disk 18a is connected by pins 18b with cam plate 3, disk 18a, cannot turn, and the actuating means 2, 3, 4, 5, 18, 18a, 2d can be easily assembled by attaching and detaching nut 2d.

Operating means for moving the actuating means in axial direction are provided in the form of a hand wheel 6 having three follower pins 8 uniformly spaced about the axis of mandrel 2 and having pointed ends respectively in contact with the cam tracks of the three cam portions 4, 5.

When hand wheel 6 is turned with follower pins 8, the same move first along the steeper cam track 5 so that cam plate 3 is displaced in axial direction toward the right together with mandrel 2 toward the right as viewed in FIG. 1 so that cone-shaped portion 2a rapidly moves jaws 1 in outward direction. When, during further turning movement of hand wheel 6, the follower pins 8 engage the less steep cam tracks of cam portions 4, angular displacement of hand wheel 6 through the same angle will cause a slower movement of the jaws 1 for gripping and clamping the workpiece 20 as a greater force.

The angle of the cam track of cam portion 5 is, for example, 20°, while the angle of the cam track of cam portion 4 is, for example, 6° so that follower pins 8 are in contact with cam portions 4 in a self-locking engagement which prevents turning of the hand wheel irrespective of any force applied to the jaws.

Due to the steepness of cam portion 5, a turning angle of hand wheel 6 of between 60° and 90° is sufficient for gripping the workpiece. In order to facilitate the manual operation of hand wheel 6, it is provided with a knurled rim 6a.

At least cam portions 4 are narrow in axial direction, as best seen in FIG. 1, and have a cam face 4a engaged by a follower pin 9. The cam tracks engaged by follower pins 8 and follower pins 9, respectively, are located on opposite sides of cam portion 4. Follower pins 9 guide the cam plate during the return of the same to its initial position under the action of spring 18.

In the initial position of the chuck, the actuating means including cam means 3, 4, 5 and mandrel 2 are retracted to the left as viewed in FIG. 1, and follower pins 8 of the operating means 6 are located on the lowest part of cam portion 5 so that con-shaped end portion 2a permits the annular springs 19 to retract all jaws 1 to an inner position in which the outer gripping faces 1a of the same are flush with the outer cylindrical surface of the slotted pin portion 30b.

When hand wheel 6 of the operating means is turned an angle corresponding to the circumferential extension of cam portions 4, 5, follower pins 8 first rapidly displace cam plate 3 with mandrel 2 while moving along cam portion 5, and then more slowly displace cam plate 3 and mandrel 2 while moving in circumferential direction along the less steep cam track 4. During the movement of the mandrel 2, the cone-shaped end portion 2a first rapidly expands the jaws 1 and then more slowly moves the jaws at great force in outward direction to grip the inner bore of a workpiece 20.

If the inner bore of the workpiece is threaded, the outer gripping faces 1a of the jaws are also threaded, but since the outer faces 1a are flush with the outer cylindrical surface of pin portion 30b, the workpiece can be placed on the same without being threaded on the threaded gripping surfaces 1a. In a gripping position, however, the thread of the outer surfaces 1a properly meshes with the inner thread of the workpiece so that the same is not damaged.

In order to release the workpiece, hand wheel 6 is turned in the opposite direction until follower pins 8 again engage the lowest parts of the cam track portions 5. Spring 18, which was compressed in the advanced operative position of mandrel 2, expands and moves the mandrel to a retracted position, together with cam means 3, 4, 5, and the return of the cam means with the mandrel is further aided by the engagement between follower pins 9 and cam track 4a. The contracting annular coil springs 19 retract jaws 1 when cone-shaped portion 2a moves toward the left as viewed in FIG. 1.

Figure 3:
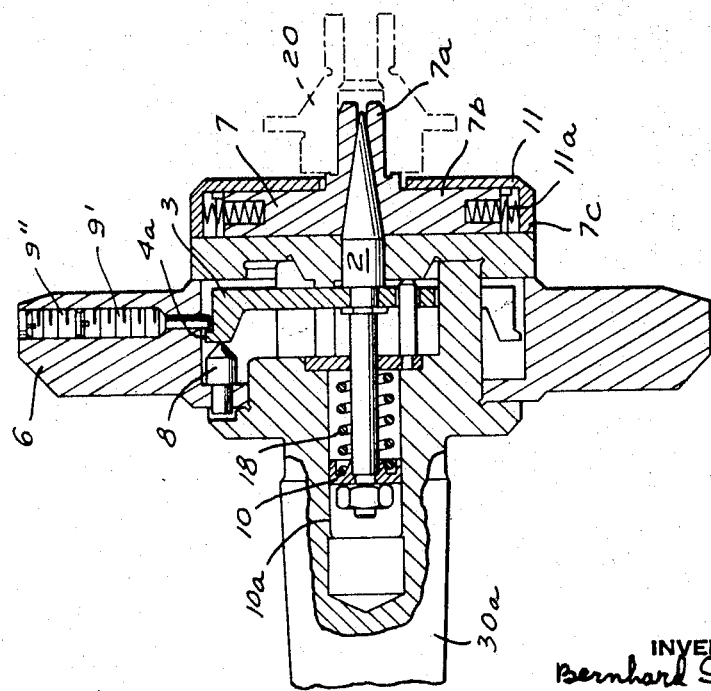
FIG. 3 is an axial sectional view illustrating another embodiment of the invention.

The embodiment of FIG. 3 corresponds substantially to the embodiment of FIG. 1, and like parts are indicated by the same reference numerals. The chuck is modified for gripping workpieces 20 having small inner bores. Each jaw 7 is L-shaped and has a narrow gripping portion so that all gripping portions 7a fit into the central bore of the workpiece, and a holding portion 7b located in a holder 11 which has radial guide means for guiding jaw portions 7b in radial direction. Springs 11a are located in recesses of each of the holding portions 7b and abut an inner surface of the outer cap 7c of the holding means.

As in the embodiment of FIG. 1, the jaws have inner wedge faces in sliding engagement with the cone-shaped end portion of mandrel 2 which acts as a wedge means to displace the jaws in outward direction to a gripping position clamping the inner surface of the bore in workpiece 20.

Instead of slanted follower pins 9, the follower pins 9' of the embodiment of FIG. 3 are disposed in radial direction in hand wheel 6 and are secured in radial bores in the hand wheel by worm screws 9''.

A ring 10 having a cylindrical peripheral slide face has an annular recess receiving spring 18, and is slidable in the bore 10a so that the axial guidance of mandrel 2 is improved.

The embodiment of FIG. 4 corresponds to the embodiment of FIG. 1, and like parts are indicated by the same reference numerals. Follower pins 9' are radially disposed in hand wheel 6 and located in a plane perpendicular to the axis of the chuck, as explained with reference to FIG. 3.

In the embodiment of FIG. 4, control stop means are provided for determining the axial position of a workpiece 20 when the same is placed on the jaws 1, and before it is gripped by the jaws. A stop pin 13 is mounted in an axial bore of the supporting portion 30a and urged by a spring 15 to move to an advanced stop position in which its front end portion 13a is located in the position 13a', projecting through a bore in holder cap 7' into the proximity of jaws 1 so that a workpiece placed in the initial inoperative position of the chuck on jaws 1 abuts the advanced end portion 13a' whereby the axial postion of the workpiece relative to the jaws 1 is determined.

However, while cutting or other operations are carried out on the workpiece, stop portion 13a in the position 13a' would be in the way of the tool, and therefore control stop means 13 is retracted to the position illustrated in solid lines when the jaws are moved outwardly to the gripping position by the operation of hand wheel 6.

A double arm connecting lever 17 is mounted on cap 7' for angular movement about a pivot pin 16 and has a first arm abutting a shoulder of control stop pin 13 and another arm abutting a pin 14 secured to cam plate 3.

When hand wheel 6 is turned to its initial position in which mandrel 2 and jaws 1 are retracted, cam plate 3 and pins 14 are displaced to the left as viewed in FIG. 4 as compared with the illustrated position, so that spring 15 urges pin 13 to the advanced position 13a'. When hand wheel 6 is turned and follower pins 8 urge cam plate 3 to the illustrated position in axial direction toward the right as viewed in FIG. 4, pin 14 turns connecting lever 17 so that the same displaces stop pin 13 to the left to the illustrated position while compressing spring 15. The movement of cam plate 3 is transmitted to mandrel 2 and jaws 1 so that the workpiece is gripped and can be machined while the stop portion 13a is retracted as shown in solid lines in FIG. 4.

It will be understood that each of the elements described above, or two or more together, may also find a useful application in other types of chucks differing from the types described above.

While the invention has been illustrated and described as embodied in a manually operated chuck having internal jaws and capable of rapidly clamping a workpiece, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Universal chuck comprising, in combination, supporting means; a plurality of jaws mounted on said supporting means uniformly spaced about an axis and for movement in radial direction; actuating means mounted on said supporting means for movement along said axis and having wedge means for displacing said jaws simultaneously in radial direction from an inoperative position to a gripping position; and operating means mounted on said supporting means for angular movement about said axis; one of said last stated two means including cam means having a plurality of circumferentially extending axially rising cam portions uniformly spaced about said axis, and the other one of said last stated two means having a plurality of follower means respectively engaging said cam portions so that said actuating means are axially moved during angular displacement of said operating means whereby said wedge means move said jaws to said gripping position.

2. Universal chuck as claimed in claim 1, wherein said operating means are adapted to be manually turned and include said follower means; wherein said actuating means include a mandrel having a cone-shaped end portion forming said wedge means and being in sliding contact with inner portions of said jaws for moving the same outward to said gripping position; wherein said cam means include a cam plate having a central portion secured to said mandrel and a plurality of radial arms having said cam portions on the outer ends thereof; and wherein said supporting means include guide means for guiding said actuating means in axial direction and for blocking rotation of the same.

3. Universal chuck as claimed in claim 2 wherein at least a portion of the cam track of each of said cam portions rises at such a gradient as to be self-locking.

4. Universal chuck as claimed in claim 2 wherein each of said cam portions has a first cam track portion having a first higher gradient, and a second cam track portion having a second lower gradient so that said first cam track portions control said jaws to approach a workpiece at a high speed, and said second cam track portions control said jaws to grip the workpiece at a lower speed; and wherein the gradient of said second cam track portion is selected so that said second cam track portion is self-locking whereby said operating means cannot be turned by pressure on said jaws.

5. Universal chuck as claimed in claim 2 wherein said jaws are mounted on said supporting means for movement in radial direction between an inoperative and a gripping position; wherein said cam portions have such a gradient that movement of said follower means over an angle of between 60° and 90° causes movement of said jaws from said inoperative to said gripping position; and wherein said supporting means include means for limiting the turning movement of said operating means to an angle between 60° and 90°.

6. Universal chuck as claimed in claim 2 wherein said supporting means includes a tubular portion having a bore for slidably guiding said mandrel, and having a plurality of radial slots for slidably guiding said jaws; and wherein said jaws are movable between an inoperative position in which the outer ends thereof are flush with the outer surface of said tubular portion, and a gripping position in which said outer ends project from said tubular portion.

7. Universal chuck as claimed in claim 2 wherein said arms of said cam plate are elastic to such a degree that jamming of said jaws in a workpiece causes no permanent deformation of said cam plate or of said workpiece.

8. Universal chuck as claimed in claim 2 wherein said jaws have a L-shaped radial cross section, each jaw including a radially extending guide portion guided in said supporting means, and a gripping portion of small radius adapted to engage a small central bore of a workpiece.

9. Universal chuck as claimed in claim 2 including a spring means surrounding said mandrel and abutting said supporting means and said mandrel for urging the same and thereby said cam plate into engagement with said follower means so that said spring means is compressed when said cone-shaped portion of said mandrel is advanced into said jaws, and biases said actuating means to return to an initial position.

10. Universal chuck as claimed in claim 9 wherein said supporting means includes a portion having an axial bore; and wherein said actuating means include a guide ring secured to said mandrel and having a periphery slidably engaging said bore for guiding said mandrel in axial direction; and wherein said spring means has one end abutting said guide ring.

11. Universal chuck as claimed in claim 9 wherein said cam portions have first cam tracks located on one side of said cam plate and respectively engaged by said follower means, and second cam tracks substantially parallel to said first cam tracks and located on the other side of said cam plate; and wherein said operating means include other follower means in contact with said second cam tracks for returning said actuating means to an initial position.

12. Universal chuck as claimed in claim 11 wherein said operating means includes a hand wheel mounted on said supporting means for angular movement; and wherein said first mentioned and other cam follower means are studs mounted on said hand wheel and having pointed portions respectively cooperating with said first and second cam tracks.

13. Universal chuck as claimed in claim 2 comprising annular springs for mounting said jaws on said cone-shaped portion of said mandrel; and wherein said mandrel is detachably connected with said cam plate and forms with said jaws and annular springs a detachable and replaceable unit.

14. Universal chuck as claimed in claim 2 comprising control stop means mounted on said supporting means for axial movement between a retracted inoperative position and an advanced stop position for determining the axial position of a workpiece on said jaws, spring means for urging said control stop means to said advanced position; and connecting means connecting said control stop means with said actuating means so that said control stop means is retracted to said inoperative position when said actuating means are axially displaced to move said jaws to said gripping position.

15. Universal chuck as claimed in claim 14 wherein said control stop means include a pin mounted on said supporting means for axial movement, and having an abutment; and wherein said connecting means include a double-armed lever means mounted on said supporting means for pivotal movement and having one portion abutting said abutment, and another portion abutting said cam plate so that said pin moves in axial direction opposite to the movement of said cam plate.

16. Universal chuck as claimed in claim 1 wherein said actuating means are movable in axial direction between a retracted position and an advanced position for displacing said jaws; comprising spring means in said supporting means for biasing said actuating means to move to said retracted position; and wherein said operating means include a hand wheel on which said follower means are mounted; and wherein said cam portions have cam tracks rising in one circumferential direction so that the turning movement of said hand wheel with said follower means in said one circumferential direction displaces said cam means and said actuating means against the action of said spring means into said advanced position.

References Cited

UNITED STATES PATENTS

| | | | |
|---|---|---|---|
| 2,367,863 | 1/1945 | Grey | 279—2 XR |
| 2,399,831 | 5/1946 | Schmidt | 279—2 |
| 2,750,196 | 6/1956 | Peczynski | 279—2 |

OTHER REFERENCES

F. H. Calrin and F. A. Stanley, American Machinist Grinding Book, p. 332, "Expansion Chuck for the Buffing Machine," 1912.

ROBERT C. RIORDON, Primary Examiner

D. D. EVENSON, Assistant Examiner

U.S. Cl. X.R.

82—44